(12) United States Patent
Thomas

(10) Patent No.: US 11,777,149 B2
(45) Date of Patent: Oct. 3, 2023

(54) STACKABLE BATTERY BUSSING SYSTEM

(71) Applicant: Paladin Power Inc., Murrieta, CA (US)

(72) Inventor: Ted Thomas, Temecula, CA (US)

(73) Assignee: Paladin Power, Inc.

( * ) Notice: Subject to any disclaimer, the term of this patent is extended or adjusted under 35 U.S.C. 154(b) by 0 days.

(21) Appl. No.: 16/807,146

(22) Filed: Mar. 2, 2020

(65) Prior Publication Data

US 2020/0280041 A1 Sep. 3, 2020

Related U.S. Application Data

(60) Provisional application No. 62/812,786, filed on Mar. 1, 2019.

(51) Int. Cl.
| | |
|---|---|
| *H01M 10/42* | (2006.01) |
| *H01M 50/531* | (2021.01) |
| *H01M 50/209* | (2021.01) |
| *H01M 50/507* | (2021.01) |

(52) U.S. Cl.
CPC ........ *H01M 10/425* (2013.01); *H01M 50/209* (2021.01); *H01M 50/507* (2021.01); *H01M 50/531* (2021.01); *H01M 2010/4278* (2013.01)

(58) Field of Classification Search
CPC .. H01M 50/502; H01M 50/20; H01M 50/531; H01M 10/425; H01M 2010/4278; H01M 2220/20
See application file for complete search history.

(56) References Cited

U.S. PATENT DOCUMENTS

| | | | |
|---|---|---|---|
| 8,980,465 B2 * | 3/2015 | Ahn | H01M 50/172 |
| | | | 429/178 |
| 2007/0207377 A1 * | 9/2007 | Han | H01M 50/543 |
| | | | 429/162 |
| 2009/0206841 A1 | 8/2009 | Weng | |
| 2012/0308858 A1 | 12/2012 | Hermann et al. | |

(Continued)

FOREIGN PATENT DOCUMENTS

| | | | | |
|---|---|---|---|---|
| WO | WO 2018/009558 | * | 1/2018 | H01M 6/42 |

OTHER PUBLICATIONS

WO, PCT/US20/20715 ISR and Written Opinion, dated Sep. 10, 2020.

*Primary Examiner* — Michael L Dignan
(74) *Attorney, Agent, or Firm* — Dentons Cohen & Grigsby P.C.

(57) ABSTRACT

A stackable electrical-energy bussing system, for energy storage battery cells constructed according to the present invention includes a battery cell case having electrically conductive terminals that fit together with the terminals of a similar battery cell in order to enable multiple battery cells to be interconnected physically and electrically by stacking them atop each other. A Stackbatt bussing system housing contains the electricity-producing elements for each cell, connected from each opposing side. Preferably, the battery cell includes at least two such male terminals in spaced-apart relationship on the top side of the cell case, and at least two such female bus tubes that mate and receive with a spaced-apart relationship on both sides of the Stackbatt bussing system. Preferably, a multi-cell battery bussing system constructed to the invention includes multiple battery cells as described above, stacked when desired to achieve desired battery voltage for series and or parallel configurations.

10 Claims, 8 Drawing Sheets

(56) References Cited

U.S. PATENT DOCUMENTS

| | | |
|---|---|---|
| 2012/0328908 A1 | 12/2012 | Han et al. |
| 2013/0045401 A1* | 2/2013 | Yoon .................... H01M 50/543 |
| | | 429/90 |
| 2013/0052515 A1* | 2/2013 | Park .................... H01M 50/502 |
| | | 429/159 |
| 2016/0380319 A1 | 12/2016 | Rhein et al. |
| 2018/0097265 A1 | 4/2018 | Tarlau et al. |
| 2018/0151859 A1 | 5/2018 | Aizawa |
| 2018/0277820 A1 | 9/2018 | Tyler et al. |
| 2018/0315986 A1 | 11/2018 | Hirano |
| 2018/0358667 A1* | 12/2018 | Harris ................. H01M 50/502 |
| 2019/0348727 A1* | 11/2019 | Yoon .................... H01M 50/10 |
| 2020/0313128 A1* | 10/2020 | Schnakenberg .. H01M 10/6551 |
| 2021/0083241 A1* | 3/2021 | Shin .................... H01M 50/507 |

* cited by examiner

STACKABLE BATTERY BUSSING SYSTEM

CROSS REFERENCE TO RELATED APPLICATIONS

The present invention claims the benefit of provisional patent application Ser. No. 62/812,786, filed Mar. 1, 2019, by the present inventor. The provisional application is hereby incorporated by reference in its entirety.

FIELD OF THE INVENTION

The present invention relates generally to an apparatus for a rechargeable stationary and automotive energy storage bussing system for batteries. More specifically, the present invention is for a rechargeable stationary and automotive energy storage bussing system for batteries and more particularly rechargeable storage batteries such as those commonly used with any of various grid-charging, alternating current and direct current, electrical energy generator systems, including; solar-powered, wind-powered, and hydro-power systems, in addition to hydrogen fuel cells, internal combustion engines, and the like.

BACKGROUND OF THE INVENTION

Some battery applications use multiple batteries that have been electrically interconnected for high output power. Consider, for example, a lithium iron phosphate (LiFeP04) battery used for high-power, 12-volt applications. Such a battery may include four or more 3.2-volt LiFeP04 cells connected for a nominal 13-volt battery voltage at 100 ampere hours (Ah). In order to achieve greater power, multiple batteries may be connected in parallel or series with suitable wiring, with all the inherent drawbacks and challenges of connecting them that way, including wiring complexity/consistency, required space, safety considerations, maintenance requirements and labor costs.

Previous efforts have attempted to resolve aspects of the aforementioned challenges with varying degrees of success. U.S. Pat. No. 6,027,828 issued to Hahn in 2000 describes a modular stackable battery pack suitable for powering portable and handheld devices. While the modular Hahn solution appears to provide both customizability and some measure of convenience to powering relatively small and low-powered devices, it fails to address some of the concerns (safety, for example) unique to larger, high energy density and high current applications.

U.S. patent application Ser. No. 10/457,698, filed by Sharrow et. al. in 2003 discloses a stacked multiple battery assembly with an integrated switching mechanism. A rod-shaped switching mechanism and assembly is described to address some of the dangers of high-voltage battery packs, providing the ability to electrically disconnect a battery as needed to protect bystanders. The Sharrow solution, however, is relatively complex in construction/operation and its cylindrical form does not provide for a particularly compact assembly or cell storage.

More recently, U.S. patent application Ser. No. 15/282,869, filed by Ricci in 2016, has disclosed a universal modular battery and power system, allowing batteries to be exchanged, swapped or moved from one power system to another, including power systems associated with different vehicles and buildings. However, as the system disclosed by Ricci makes use of a separate bus to connect battery modules together, it may lack much of the simplicity and flexibility of an ideal solution.

What is needed is a system for compactly, conveniently and safely provisioning and re-provisioning high voltage and high capacity battery modules.

SUMMARY OF THE INVENTION

The present invention provides a bus system and a novel configuration of battery cells to safely and conveniently form a compact, flexibly-structured and/or high-performance battery power supply. The system enables batteries to be safely and compactly stacked in a variety of configurations to support different capacity, voltage and current requirements. A terminator connector (or terminator block) may be used to lock the battery into a particular voltage or capacity. The invention is particularly useful where high energy density batteries (lithium for example) are used.

DETAILED DESCRIPTION OF THE INVENTION

In view of the foregoing, it is a primary objective of the present invention to provide an improved battery cell and associated multi-cell battery connector bussing system that alleviates concerns outlined above. The present invention achieves this objective predicated on the inventor's conception of a battery that the inventor refers to as a "Stackbatt." It includes at least two battery cells having male terminals that mate in size and shape with a bussing system using copper sleeves 130 for female terminals to receive the male terminals of the battery cell in order to enable multiple battery cells to be interconnected physically and electrically by stacking them atop each other. While, the present invention works particularly well with large format prismatic cells, where energy density can be very high, it can be adapted for use with a wider variety of cells.

Figure 2:
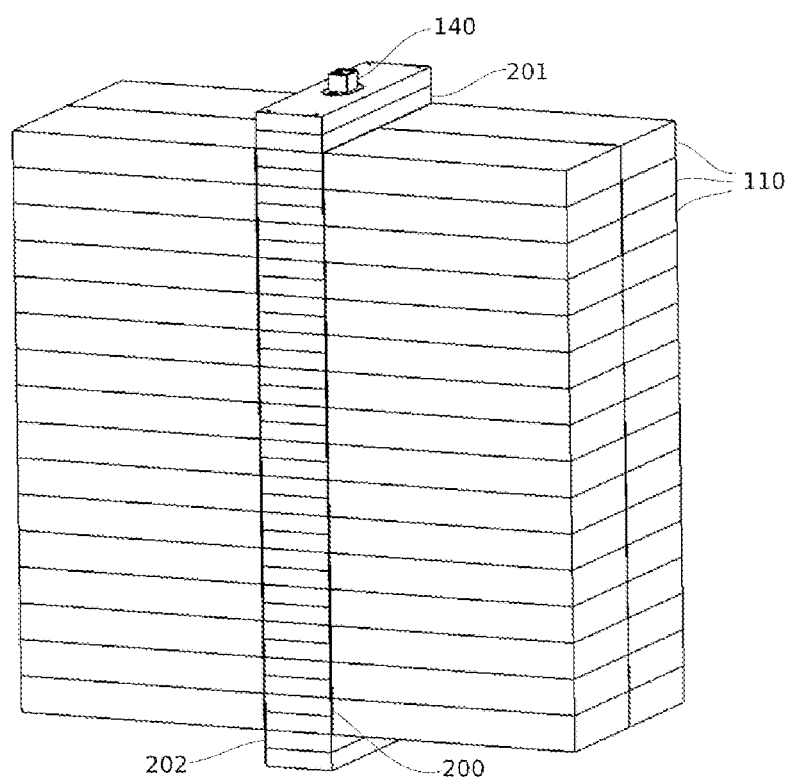
FIG. 2 shows a system including multiple layers of stacked cells consistent with the present invention.
Figure 2A:
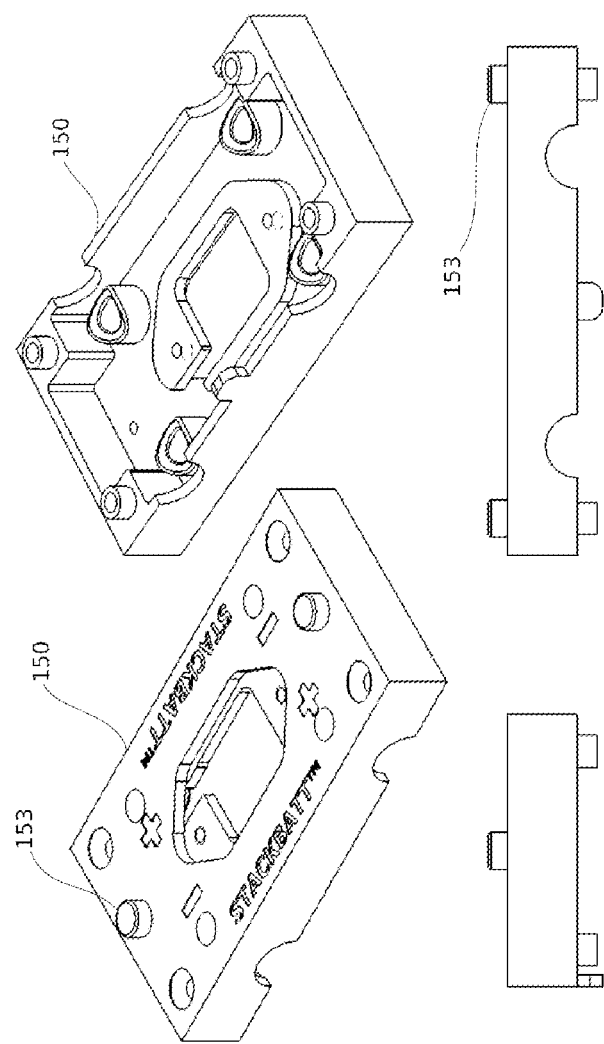
FIG. 2A shows perspective and plan views of the Stackbatt housing bussing system top section.
Figure 2B:
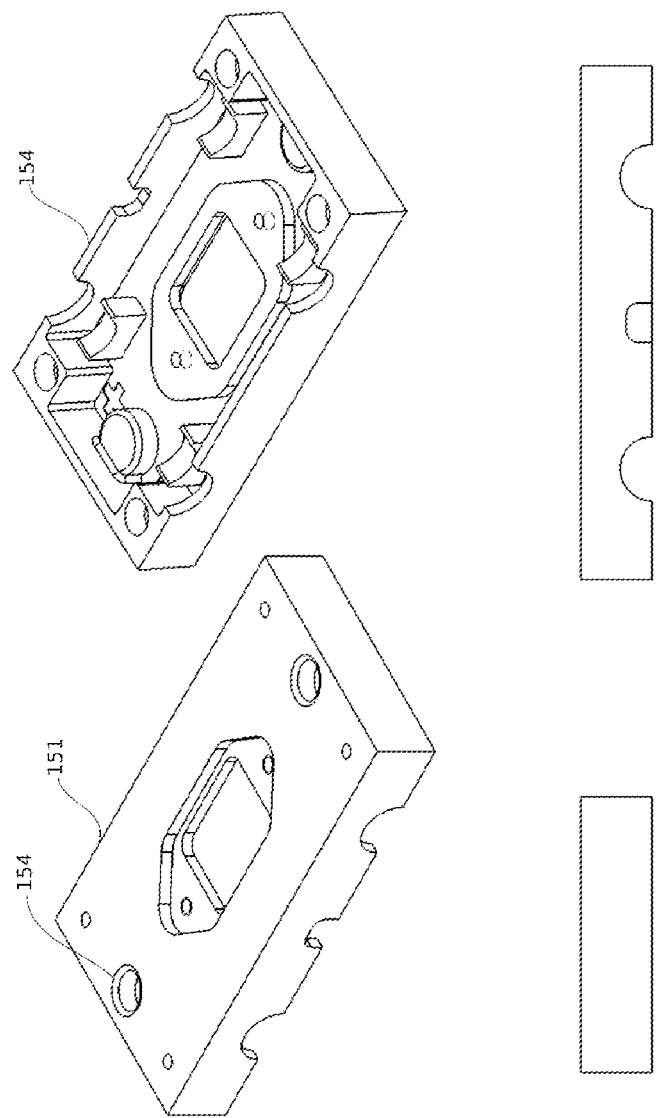
FIG. 2B shows perspective and plan views of the Stackbatt housing bussing system bottom.
Figure 4:
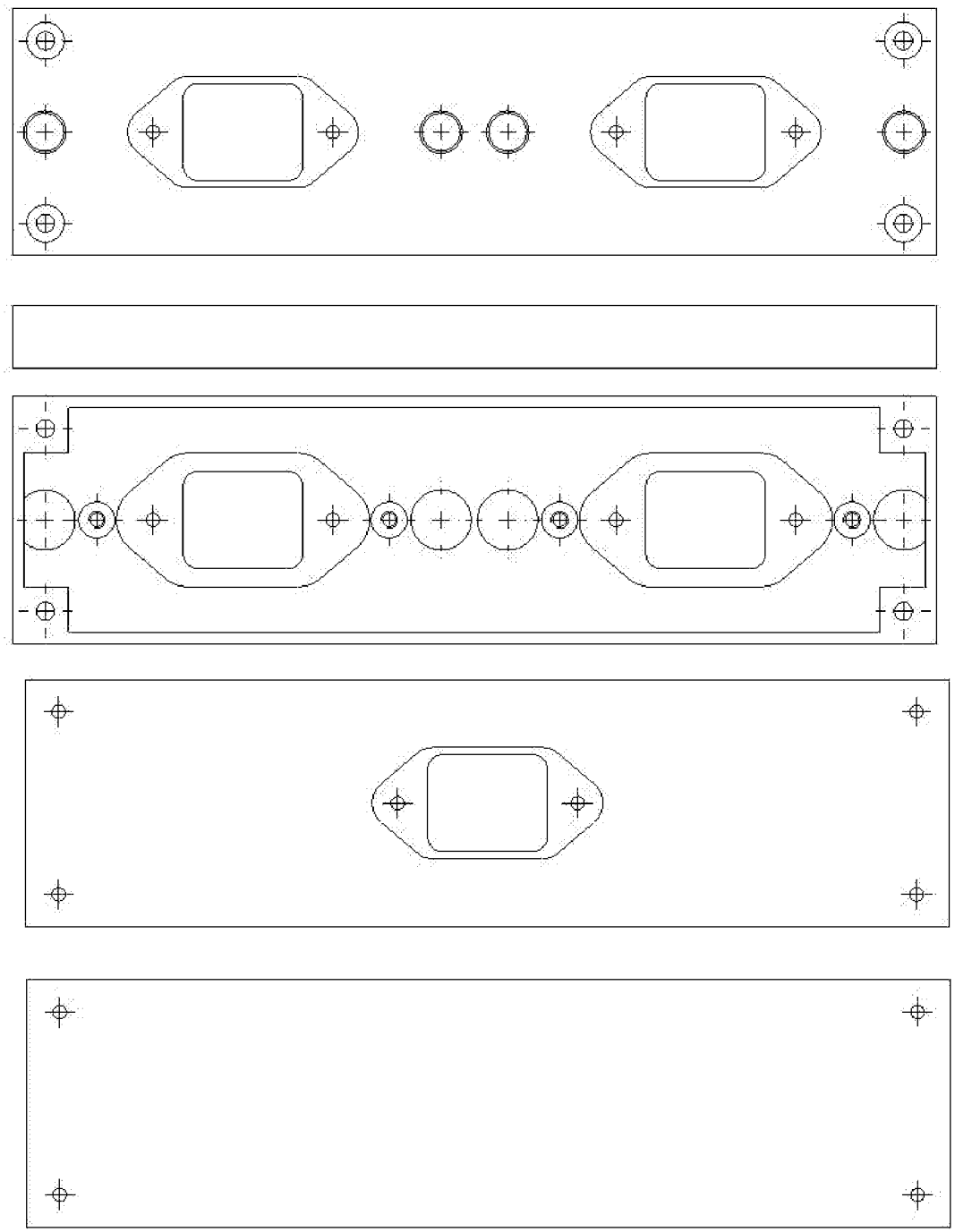
FIG. 4 shows single and dual plug terminator blocks.
Figure 5:
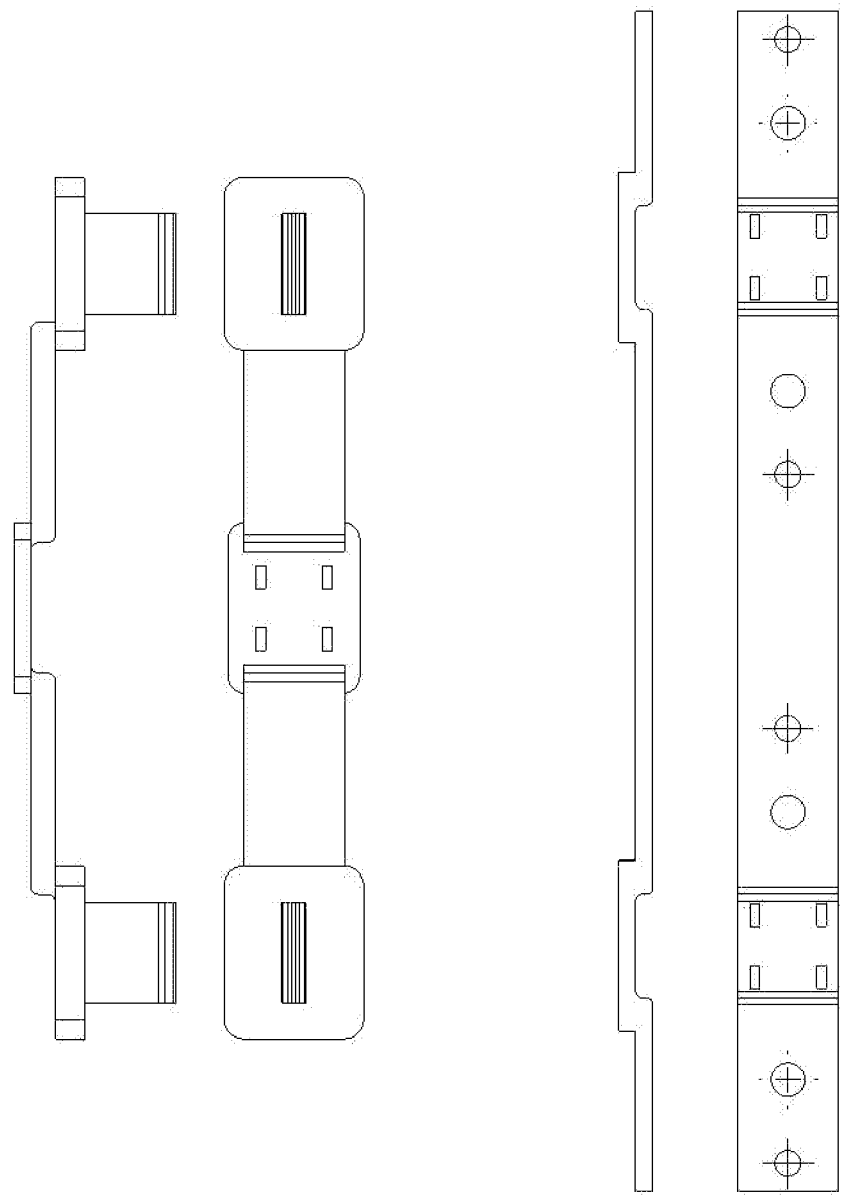
FIG. 5 shows example copper construction for terminator blocks.
Figure 6:
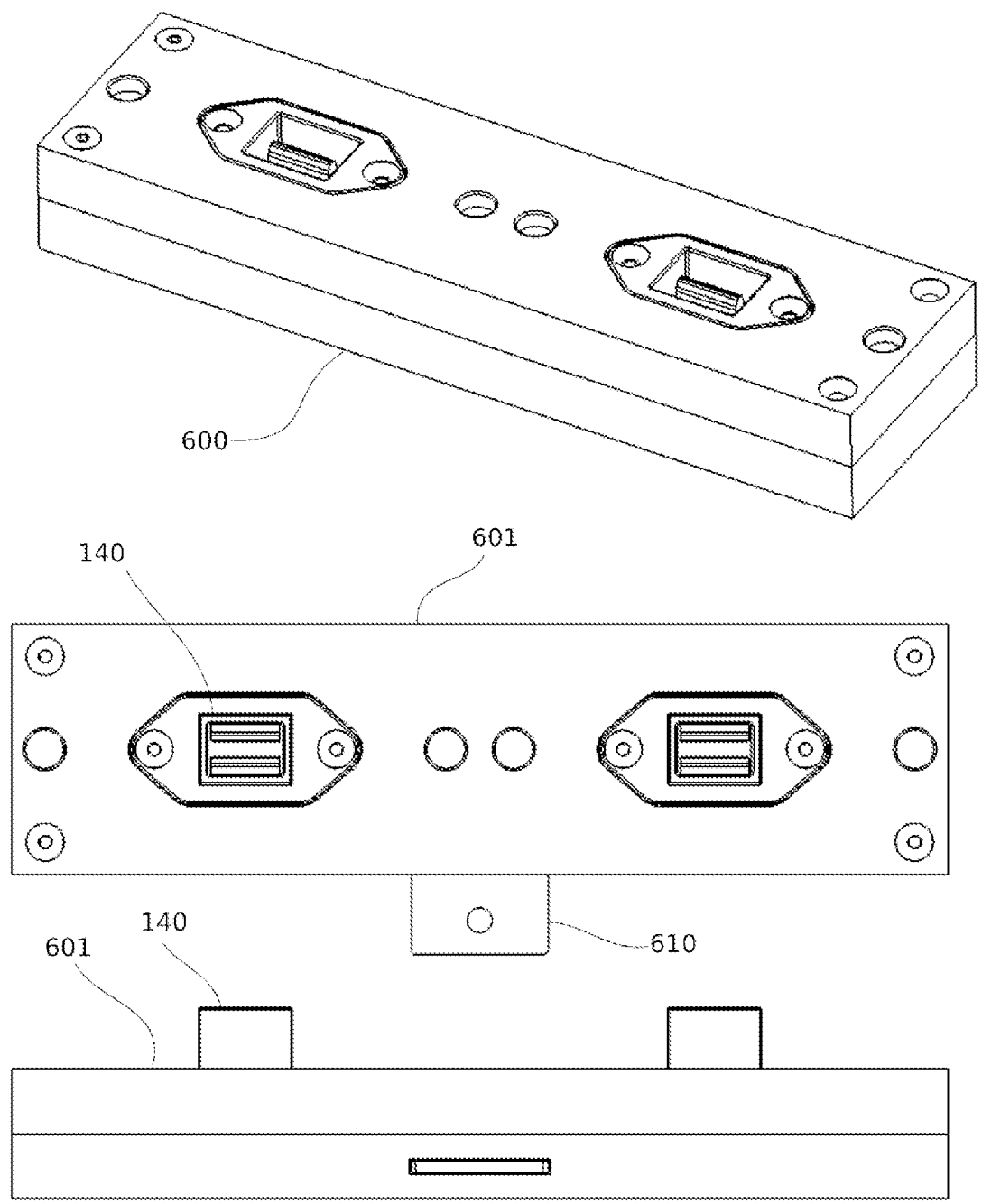
FIG. 6 shows views of top and bottom terminator blocks.

The bussing system of the present invention is integrally related to the single-plug and dual-plug termination bussing system as shown in FIG. 2 (single) FIG. 4 (displaying both). FIG. 5 shows an example of heavy duty copper construction within the terminators. Generally, the terminator bussing system helps each stacked row or column of cells to be combined into a particular desired voltage and amp hour configuration. The single-plug terminator bussing system allows control of the voltage, while the dual-plug terminator bussing system allows control of the amperage. FIG. 6 shows an example of a top terminator block 600 with dual plugs and a bottom terminator block 601 with dual plugs (female plug shown 140). Connector tabs 610 may be used to bind two columns of Stackbatt assemblies together to build a larger pack.

1. Terminal. The word "terminal" as that word is used herein in referring to a battery terminal, a cell terminal, or the like, means an electrically conductive part or contact provided on a cell or battery for use in connecting the cell or battery electrically to a load, charger, or other circuit.

2. Male Terminal. A male terminal is an electrically conductive terminal that protrudes from a cell case.

3. Male Plug. A male plug is an electrically conductive terminal on the Stackbatt bussing system housing that has an external prong protruding outward.

4. Female Plug. A female plug is an electrically conductive terminal on the Stackbatt bussing system housing that has an internal receiver that matches or mates the male plug with complimentary dimensions.

5. Bus Tube. The term "bus tube" herein as applied to male terminals means that the terminals have sizes and shapes such that the male terminal can be inserted removably into the cavity of the bus tube receiver for purposes of coupling the cells together electrically.

Figure 1:
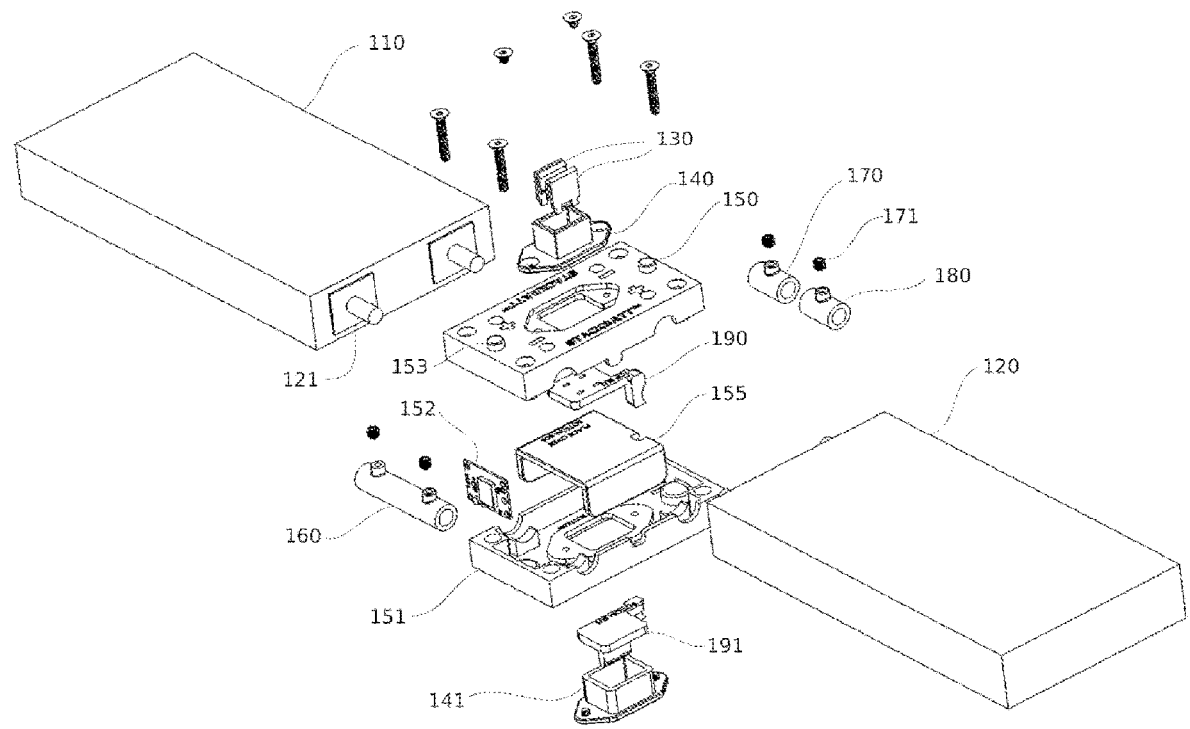
FIG. 1 shows an exploded assembly view of the battery and Stackbatt assembly housing.

FIG. 1 is an exploded assembly view of the battery and Stackbatt assembly housing which includes the following components:

151 the Stackbatt housing bussing system bottom;
155 the insulation shroud;
190 the upper bus bar;
180 bus tube that is connected to upper bus bar 190;
170 bus tube;
160 bus tube;
141 male plug housing;
191 male connector and lower bus bar;
140 female plug housing;
130 female plug clip receiver.

More specifically, a battery cell constructed according to the present invention may include a rectangularly shaped cell bussing housing. As seen in FIG. 1, the cell bussing housing 150, 151 contains the electricity-producing elements for one or more cells (two, for example 110, 120) to be connected electrically when stacked, as each cell lays flat and connects into the bus links 160, 170, 180. Two cells facing each other connect into the Stackbatt housing bussing system to form an electrical connection that forms a series connection. In a preferred embodiment, the Stackbatt housing bussing system has a male plug 140 recessed on bottom and a female plug 141 inset within an extrusion on the top, thereby allowing another Stackbatt housing bussing system to be plugged and inserted from above forming a stacked formation collectively with two additional cells connected to the next upper Stackbatt housing bussing system that increases capacity and voltage, and so on. Note that the extrusion prevents the housing from being stacked with the wrong polarity. Internally, an insulation shroud 155 helps to prevent the electrical current from taking an unintended path. The Stackbatt solution has a male terminator and a female terminator. As seen in FIGS. 4 and 5, the terminators have both single plugs and dual plugs for maximizing unlimited stack ability and for continuing a series or parallel pack configuration for a larger capacity or varying voltage configurations.

The battery cells are connected with positive and negative bussing links. These links may be made of any material that is highly conductive and otherwise suitable for use. In a preferred embodiment, the links are made of copper, although other materials may be used as appropriate. In many applications, copper will be especially preferable because it is highly conductive under ordinary circumstances, resistant to corrosion, and is not prohibitively costly. Preferably, the connectors for connecting batteries in series or parallel are rated for 2,000 amperes (or amps) DC current. The bussing links are electrically connected inside the Stackbatt housing to allow for each new layer of connected cells. Each Stackbatt housing may be fitted with alignment holes, knobs or other mechanical connectors on the top 153 and or bottom 154 to ensure proper fitting between the top housing and bottom housing section. This feature is particularly beneficial in mobile applications, such as vehicles, where excessive movement can threaten system reliability. The Stackbatt housing bussing system typically connects between two flat laying cells of equal size, shape and dimensions with terminal posts of equal size, shape, diameter and length, that face each other with opposing and opposite voltage polarity.

Figure 3:
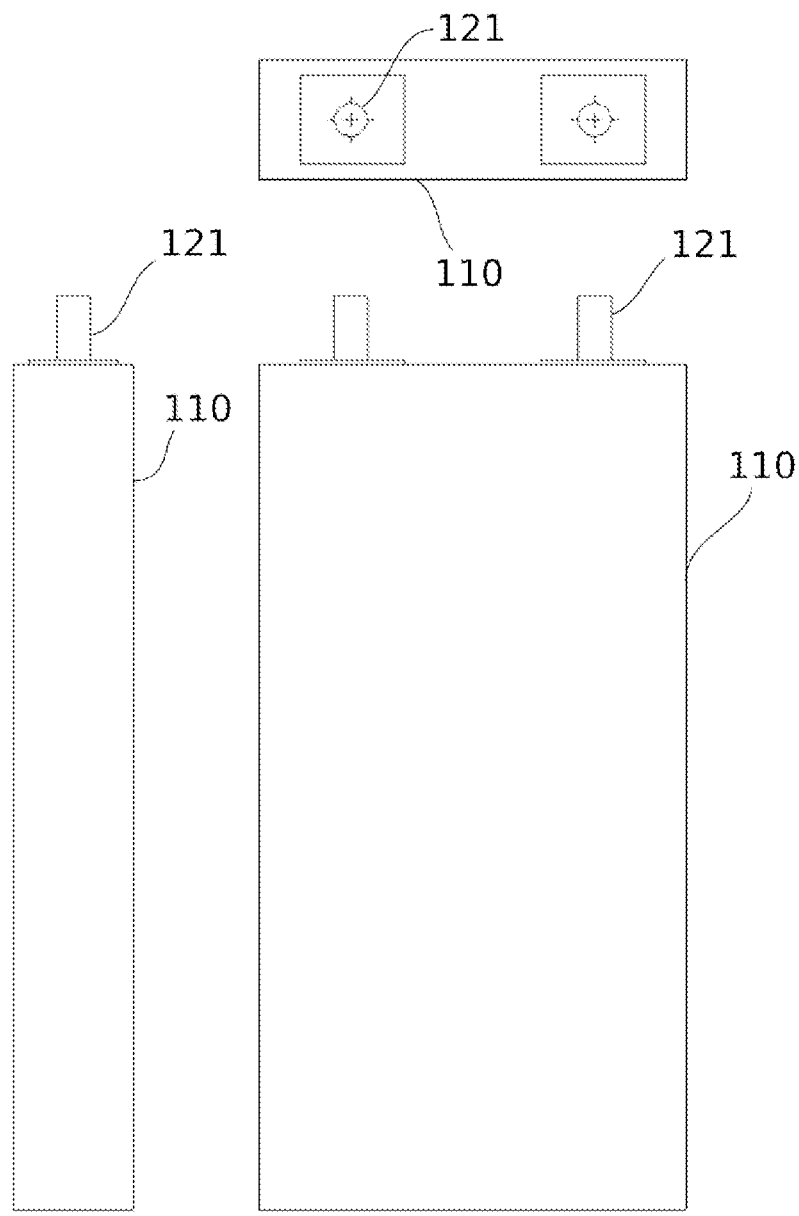
FIG. 3 shows plan views of a battery cell.

Preferably, a battery cell will have approximate dimensions of 36 mm thick, 130 mm long and 257 mm wide, providing a set of terminals 121 to mate with the bus tubes. In a preferred embodiment, a set of two cylindrical terminals are about 10 mm in diameter and with centers approximately 75 mm apart from each other, as shown in FIG. 3.

FIG. 1 shows a battery cell and Stackbatt housing bussing system according to the present invention that includes two battery cells identified as Stackbatt cells 110 and 120. The cells 110 and 120 are similar to each other. They may include known battery cell technology and be similar in some respects to existing battery cells (e.g., 3.2-volt LiFePO4 cells). The present invention enables electrical producing componentry, when connecting cells together, to form a broad range of voltage configurations of different sizes and capacities, with a high degree of safety, convenience and customizability.

The Stackbatt bussing system may employ electrically non-conductive thermal (heat resistant) plastic or another suitably insulative material on the outside. In a preferred embodiment, the battery cells 110 and 120 have male terminals 121 that slide into the Bus tube 160, 170 as reflected in FIG. 1. While the connections are designed to fit snugly, the tube and terminal configuration may be further secured by screws 171 through the tubes into the terminals. The robust and low-resistance connections are contained by the bussing housing and are separated from the cell itself. One advantage of this novel connection style is a drastic reduction in the risk of loosening or dangerous arcing. The safety is further increased by the insulation shroud 155.

Preferably, the battery bussing housing or an enclosure containing the battery housing will incorporate a material (perhaps in the form of a paint layer) with intumescent properties. An intumescent material swells in response to heat exposure and can provide benefits in the form of fire suppression or by physically moving system components away from each other to prevent harmful interactions. Such a material may be found in paint form from Firefree Coatings, Inc., a California company. Alternatively, the battery bussing housing may be manufactured (for example, by 3D printing or injection molding) using intumescent plastics with high thermal conductivity, producing a bussing system rated for 2,100 degrees Fahrenheit. In either case, extreme heating would cause the material to expand until the battery cell is completely shut down.

In another embodiment, the bussing housing may include sensors capable of monitoring heat, voltage, and amperage within the battery system and transmitting that information to a centralized battery management system. The sensors may be directly wired into the system or transmit information wirelessly (e.g. using Bluetooth or TCP/IP). The battery management system can then synthesize this information and provide more meaningful output, such as information on battery performance.

Although the invention has been explained in relation to its preferred embodiment, it is to be understood that many other possible modifications and variations can be made without departing from the spirit and scope of the invention.

What is claimed is:

1. An electrical bus bar assembly that is configured to receive pole terminals of at least one battery cell, said electrical bus bar assembly comprising:
   a housing that defines a first side and a second side, said housing further defining first and second openings on said first side of said housing and also further defining first and second openings on said second side of said housing;
   a first bus tube that defines one end, said first bus tube also defining a second end that is located oppositely on said first bus tube from said one end, said one end of said first bus tube being aligned with said first opening on said first side of said housing, said second end of said first bus tube being aligned with said first opening on the second side of said housing, said first bus tube being capable of receiving a pole terminal of a first battery cell in one end of said first bus tube and receiving a pole terminal of a second battery cell in the second end of said first bus tube;
   a bus bar having upper and lower parts that are located within said housing, the upper part of said bus bar being electrically connected to said first bus tube;
   a first electrical connector that is secured to the upper part of said bus bar;
   a second electrical connector that is secured to the lower part of said bus bar, said second electrical connector being complementarily engageable with said first electrical connector; and
   a second bus tube that defines one end, said second bus tube also defining a second end that is located oppositely on said second bus tube from said one end, said one end of said second bus tube being aligned with the second opening on said first side of said housing, said second end of said second bus tube being aligned with the second opening on the second side of said housing, said second bus tube being capable of receiving a pole terminal of a first battery cell in one end of said first bus tube and receiving a pole terminal of a second battery cell in the second end of said first bus tube.

2. The electrical bus bar assembly of claim 1 further comprising an insulation shroud that is located between a portion of the upper part of said bus bar and a portion of the lower part of said bus bar.

3. ctrical bus bar assembly of claim 1 further comprising a housing said first electrical connector, said housing being secured to the first housing part.

4. The electrical bus bar assembly of claim 3 further comprising a housing for said second electrical connector, said housing being secured to the second housing part.

5. The electrical bus bar assembly of claim 1 further comprising at least one fastener for securing said first housing part together with said second housing part.

6. An electrical bus bar assembly that is configured to receive pole connectors of at least one battery cell, said electrical bus bar assembly comprising:
   a first housing part;
   a second housing part that cooperates with said first housing part to define first and second openings for respectively receiving a pole connector of at least one battery cell;
   a first bus tube is aligned with said opening defined by said first and second housing parts, said first bus tube having an inner diameter that is capable of receiving a pole connector that is inserted through the first opening defined by first and second housing parts;
   a bus bar having upper and lower parts, said bus bar being located between said first housing and said second housing, the upper part of said bus bar being electrically connected to said first bus tube;
   a first electrical connector that is secured to the upper part of said bus bar, said first electrical connector defining an electrical receiver;
   a second electrical connector that is secured to the lower part of said bus bar, said second electrical connector defining an electrical plug of a type that is engageable with a receiver of the type defined by said first electrical connector; and
   a second bus tube that is aligned with said second opening defined by said first and second housing parts, said second bus tube having an inner diameter that is capable of receiving a pole connector that is inserted through the second opening defined by first and second housing parts.

7. The electrical bus bar assembly of claim 6 further comprising an insulation shroud that is located between a portion of the upper part of said bus bar and a portion of the lower part of said bus bar.

8. The electrical bus bar assembly of claim 6 further comprising a housing for said first electrical connector, said housing being secured to the first housing part.

9. The electrical bus bar assembly of claim 8 further comprising a housing for said second electrical connector, said housing being secured to the second housing part.

10. The electrical bus bar assembly of claim 6 further comprising at least one fastener for securing said first housing part together with said second housing part.

* * * * *